(No Model.)

G. STEPHENS.
HARROW.

No. 256,863. Patented Apr. 25, 1882.

Attest.
Sidney P. Hollingsworth
Newton Wyckoff.

Inventor.
George Stephens.
By his Atty
Philip T. Dodge.

United States Patent Office.

GEORGE STEPHENS, OF MOLINE, ILLINOIS.

HARROW.

SPECIFICATION forming part of Letters Patent No. 256,863, dated April 25, 1882.

Application filed February 7, 1882. (No model.)

*To all whom it may concern:*

Be it known that I, GEORGE STEPHENS, of Moline, in the county of Rock Island and State of Illinois, have invented certain Improvements in Harrows, of which the following is a specification.

My invention relates to that class of harrows wherein several frames arranged side by side are connected separately with and drawn by a draft-bar; and the invention consists in the application of vertically-slotted couplings between the frames and draft-bar in place of the usual coupling-chains, whereby the sections or frames are permitted to rise and fall in following the irregularities in the surface, but at the same time prevented from swinging laterally.

In the use of harrows having the frame-sections drawn by chains much trouble is experienced on account of the lateral play or swinging motion of the sections, the harrow turning out of the line of draft and performing its functions in a defective manner. By the use of a slotted connection between the section and draft-bar the difficulty is entirely avoided.

My coupling may be modified in form provided its mode of action is retained; but it is preferred to adhere to the form represented in the accompanying drawings, in which—

Figure 1:
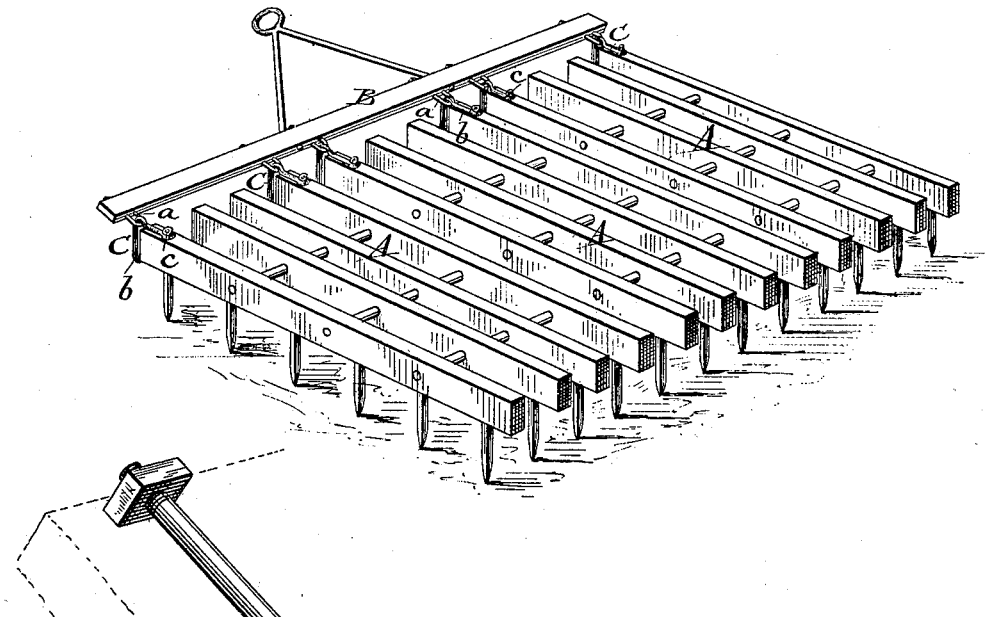
Figure 2:
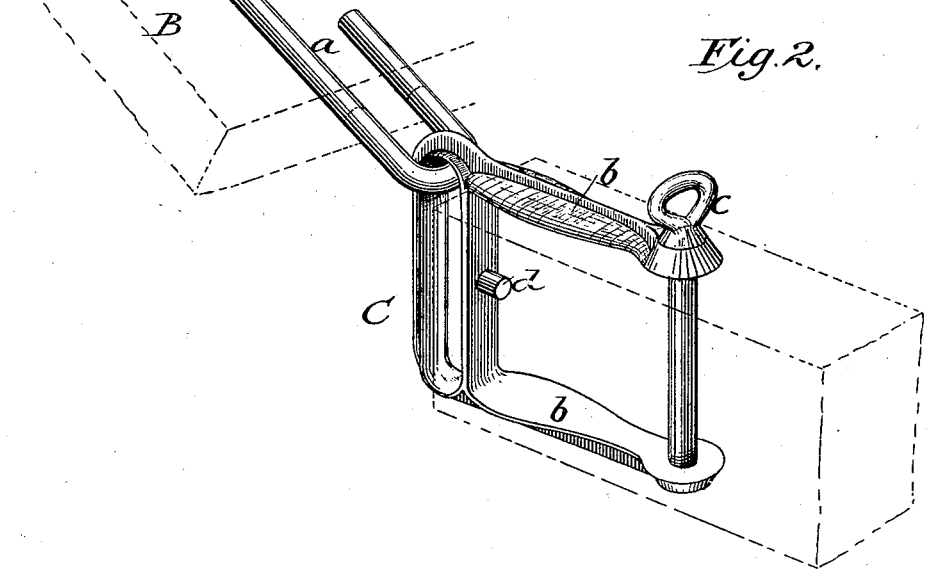

Figure 1 represents a perspective view of a harrow containing my improvement; Fig. 2, a perspective view of the coupling.

A A represent the harrow frames or sections, of which there may be two, three, or more, constructed in any ordinary or suitable manner, provided with teeth, as usual, and arranged side by side. B represents the draft-bar, to which the draft-animals are hitched when in action. The bar lies across the front of the harrow, past all the frames, as usual, and is connected with the forward end of each frame by two of my improved couplings, C. Each coupling consists, as shown in Fig. 2, of an eye bolt or hook-shaped bolt, *a*, attached to the draft-bar and arranged to slide vertically upon the forward slotted end of a clevis, *b*, secured to the harrow-frame.

The clevis consists of the slotted forward end and two arms extending thence backward above and below the frame to receive the fastening-bolt C. At the forward end the clevis is provided with a backwardly-extending lug, *d*, which is seated in a hole in the frame to prevent the clevis from swinging horizontally. By making use of the hook-shaped bolt I am enabled to pass its end through the clevis, and then, by drawing it forward until its end is seated in or against the bar, to prevent the escape of the clevis therefrom.

It is manifest that the clevis may be attached to the draft-bar and the bolt applied to the harrow, and that the parts may be modified as desired, provided they permit a free vertical motion, but prevent lateral and longitudinal motion of the frame.

The several frames may be connected with each other or not, as preferred.

I am aware that in sectional harrows the several harrow-frames or sections have been connected with each other by means of vertically-slotted couplings, and this I do not claim, my invention relating solely to harrows in which sections are connected independently with a front draft-bar common to all.

What I claim is—

1. The combination, with the independent harrow-frames arranged side by side, the transverse draft-bar arranged in advance of said frame, and the vertically-slotted couplings applied two between each harrow and the draft-bar.

2. In combination with the harrow-frame and draft-bar, the vertically-slotted clevis and the hook-shaped bolt having its rear end seated and covered, as shown, whereby the disengagement of the clevis is prevented.

3. The combination of the transverse draft-bar B, the harrow-frame A, connected thereto by two vertically-slotted couplings, each constructed substantially as shown, to permit motion between the parts in a vertical direction only.

GEORGE STEPHENS.

Witnesses:
S. C. WHEELOCK,
SOLOMON HIRSCH.